United States Patent [19]

Bar-Sheshet

[11] Patent Number: 5,193,444
[45] Date of Patent: Mar. 16, 1993

[54] APPARATUS FOR HEATING, COOKING AND ROASTING FOOD

[75] Inventor: Shlomo Bar-Sheshet, Wilmette, Ill.

[73] Assignee: Rair Systems, Inc., Northbrook, Ill.

[21] Appl. No.: 686,426

[22] Filed: Apr. 16, 1991

[51] Int. Cl.$^5$ .................. A47J 27/026; A47J 37/04
[52] U.S. Cl. .................. 99/427; 34/133 R; 34/133 L; 99/348; 99/357; 99/443 R; 99/447; 99/450; 99/476; 126/21 A; 219/389; 219/400; 366/227; 366/234
[58] Field of Search ........... 99/427, 407, 409, 443 R, 99/447, 448, 450, 467, 473–476, 477–479, 418, 449, 483, 348, 357; 219/400, 399, 389; 126/21 A; 34/135, 133 L, 133 R; 366/227, 234

[56] References Cited

U.S. PATENT DOCUMENTS

| | | | |
|---|---|---|---|
| 255,477 | 3/1882 | Ullrich | 99/476 X |
| 620,355 | 2/1899 | Potter | 34/133 L |
| 642,916 | 2/1900 | McCaskell | 34/133 L |
| 1,524,387 | 1/1925 | Burns et al. | 34/133 L |
| 2,317,532 | 4/1943 | James | 99/476 |
| 2,360,838 | 10/1944 | Atti | 99/476 |
| 2,975,527 | 3/1961 | Bushway | 99/476 |
| 4,155,294 | 5/1979 | Langhammer et al. | 99/427 |
| 4,295,419 | 10/1981 | Langhammer | 99/443 R |
| 4,410,553 | 10/1983 | McGinty | 99/348 |
| 4,421,018 | 12/1983 | Pryputsch | 99/447 |
| 4,503,760 | 3/1985 | Pryputsch et al. | 99/447 |

FOREIGN PATENT DOCUMENTS

2657744 6/1978 Fed. Rep. of Germany ........ 99/427

Primary Examiner—Timothy F. Simone
Attorney, Agent, or Firm—Wallenstein, Wagner & Hattis, Ltd.

[57] ABSTRACT

A forced air oven for and a method of heating, cooking or roasting granular food, such as nuts, seeds and coffee beans. The apparatus houses a hollow cylindrical drum into which food is placed. A heated gaseous stream is forced through the inside of the drum with sufficient force to blow the food away from the inside surface of the drum. In addition, perforations in the drum are positioned such that the heated gaseous stream blows the food toward a rear end of the drum and causes the food to churn. This churning allows the heated air to envelope the outside surface of the food and provides an even transmission of heat to the food. In addition, the drum is provided with a helical fin that pushes the food toward a front end of the drum. A wire mesh is also provided for collecting particles that are dislodged from the food, and an exhaust system is provided for venting the gasses created during the heating, cooking or roasting of food. Finally, the apparatus is equipped with a door that has feed and discharge gates for inserting and removing the food without opening the door.

30 Claims, 2 Drawing Sheets

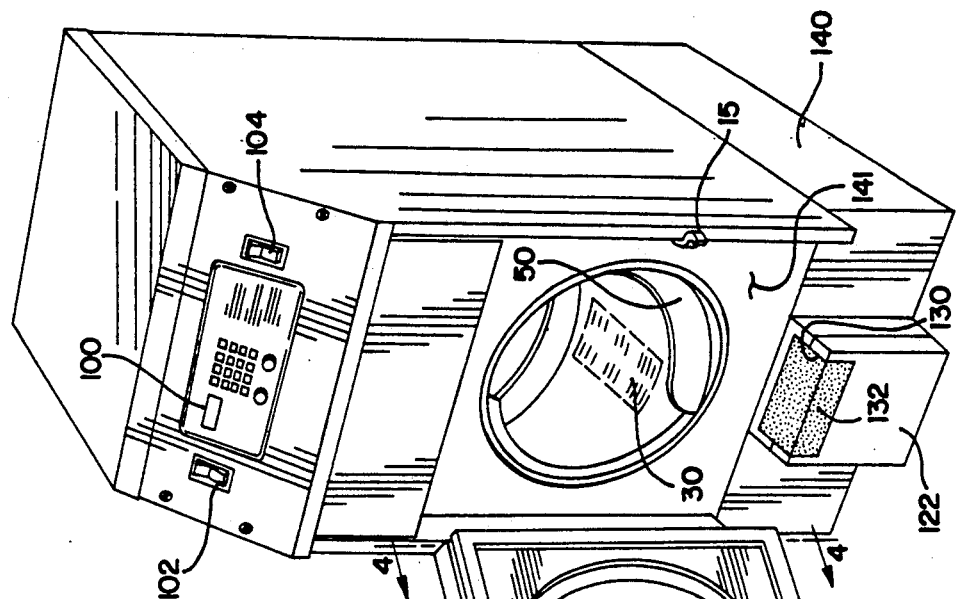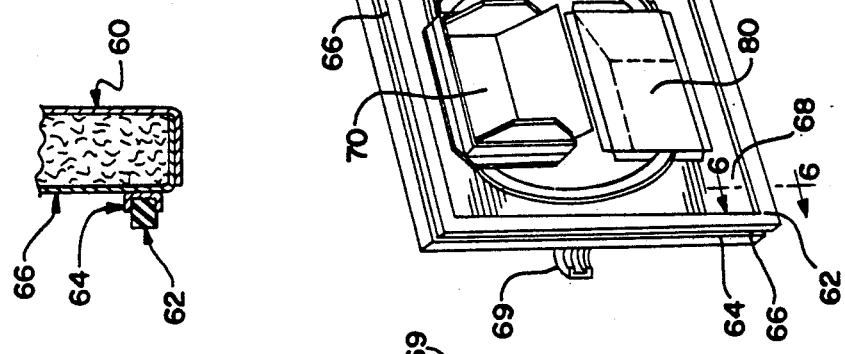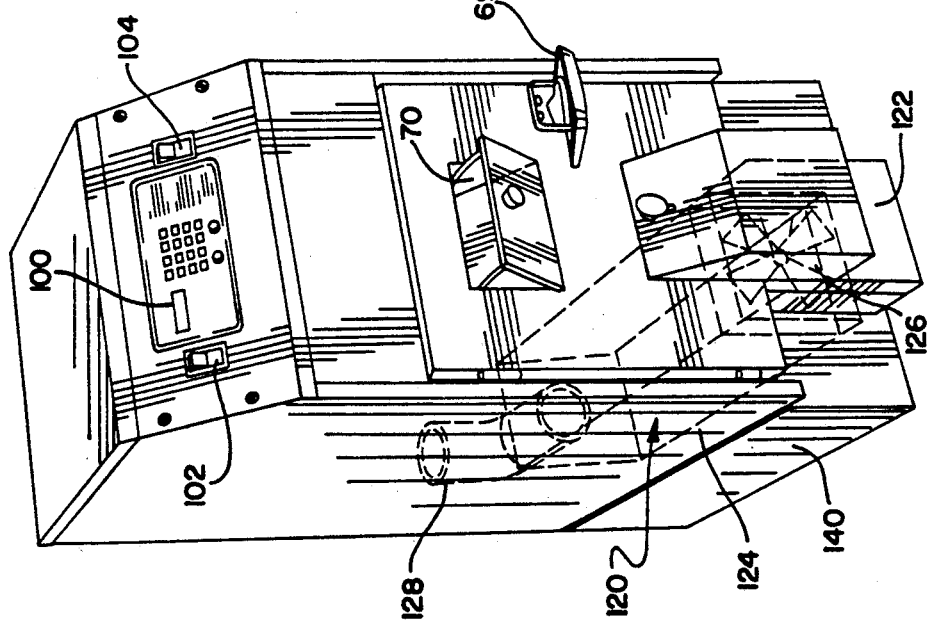

APPARATUS FOR HEATING, COOKING AND ROASTING FOOD

DESCRIPTION

1. Technical Field of the Invention

The invention relates to an apparatus for and method of heating, cooking or roasting granular food, such as nuts, seeds and coffee beans. The invention uses a forced air oven that is adapted to churn the food so that heated air surrounds the food.

2. Background Prior Art

Conventional forced air ovens for cooking and heating food are well known in the art. Such a forced air oven is described in U.S. Pat. No. 4,503,760, whose disclosure is incorporated by reference. As disclosed in this patent, such convection-type ovens include a housing and a rotating drum with openings for varying the direction of the heated air. In this way, the food inside the drum is uniformly heated. To prevent its being damaged, the food is placed on a stationary tray inside the drum.

As further disclosed in U.S. Pat. No. 4,503,760, several types of cooking apparatus utilize a rotating drum without a stationary tray for supporting the food. For example U.S. Pat. No. 4,155,294 discloses an apparatus containing a rotating cage for cooking french fries. The rotating cage causes the french fries to tumble during the cooking process.

These convection-type ovens have proven suitable for uniformly heating and cooking various types of food. For example, these ovens are useful for heating pizza or sandwiches, which expose a large surface area to the heated air. These ovens are also good for quickly heating food which readily transfers or conducts heat to its center. These ovens are useful for food that is to be cooked more thoroughly on its surface, such as french fries. Finally, such ovens are suitable for foods whose outside surface may be more thoroughly cooked, such as popcorn.

However, the above apparatus are poorly suited for heating, cooking or roasting food that has a small surface area, poor thermal conductivity, or is not intended to be heated, cooked or roasted more thoroughly on the outside. Examples of such foods are nuts and seeds, and in particular coffee beans.

It has long been known that roasted coffee beans will produce coffee with improved flavor, body, and aroma. To achieve the best coffee beans possible, roasting should be completed in the shortest possible time and at the lowest possible temperature. First, the beans are subjected to temperatures sufficient to evaporate their moisture content. Then, the dried coffee beans are heated to a temperature of at least 400 degrees Fahrenheit. At this temperature, the beans absorb a defined number of calories per pound. A variety of chemical reactions also take place within the beans.

At about 400 degrees Fahrenheit, pyrolysis, or thermal decomposition and chemical change, occurs within the bean. This causes a softening in the cellular structure of the bean, and results in a swelling of the bean and release of carbon dioxide gas. Simultaneously, the chaff becomes detached from the bean.

As roasting continues, the temperature of the bean increases, the bean color darkens, and acids are driven out of the bean and evaporated. Some acids adversely affect the flavor of the coffee and are intended to be driven out of the bean. Other acids released during more advanced stages of the roasting process add to the flavor, body and aroma of the coffee, and are not intended to be driven out of the bean. It is thus very important to stop the roasting process at the appropriate time, and this is done by spraying or quenching the beans. Water is typically used for quenching.

Unfortunately, quenching also allows the coffee bean to absorb moisture. This absorption of moisture initiates staling of the bean and diminishes the flavor of the coffee. The initiation of staling can also be caused by absorption of airborne moisture. Furthermore, packaging does not slow or inhibit staling that has begun. Consequently, beans that are roasted prior to packaging undergo substantial staling and flavor deterioration during shipping.

Conventional coffee bean roasters, such as the Jubilee roaster developed by Jabez Burns & Sons, Inc. in 1914, suffer from a variety of problems which adversely impact the quality of the coffee beans produced. These roasters are characterized by direct gas flame heating of air within a perforated roasting cylinder. Heat is transferred to the surface of the beans by convection from the air and gasses, typically at a temperature of over 500 degrees Fahrenheit. Unfortunately, a large amount of heat is also transferred to the bean by conduction from the cylinder wall which is typically at a temperature of greater than 800 degrees Fahrenheit.

Although the Jubilee roaster shortened roasting time, it created many problems which are uncorrected even today. As mentioned above, much heat is transferred to the beans by conduction from the drum wall. Yet, only a small portion of a bean's outer surface contacts the drum at a given time. Thus, heat is transferred to only a small portion of the bean by the hot surface of the cylinder. This results in an uneven heating of the beans and requires an increase in operating temperature or heat source temperature.

In addition, the chaff becomes dislodged from the bean and falls against the walls of the drum where it is burned. This burnt chaff is distasteful and difficult to remove from the coffee beans after the roasting process is complete. In addition, the burnt chaff forms a film around the beans, which inhibits heat from entering the bean. As a result, much of the burnt chaff is ground up and/or packaged with the coffee beans and an increase in operating temperature is required.

Furthermore, conventional roasters produce gases which include aldehydes, ketones, alcohols, acids, and other complex organic vapors. At temperatures over 500 degrees Fahrenheit, these organics are very reactive and polymerize into a smoke which cannot be readily dissolved, collected or filtered. This smoke is the "tar" of roasting and deposits a tar film on the surface of every bean. These tars are a suspected carcinogen and a byproduct of the pyrolytic process. Moreover, this tar film is a poor thermal conductor and prevents heat from entering into the bean. Consequently, the operating temperature must be increased, which causes further production of tar.

Finally, conventional roasters are large and are often subject to fires inside the apparatus. Consequently, such apparatus is not suitable for use in businesses, such as a restaurant or coffee shop, or in residences. Consumers must thus purchase relatively stale coffee with the associated decrease in flavor, body and aroma.

The present invention is provided to solve these and other problems.

SUMMARY OF THE INVENTION

The present invention relates to an apparatus for and method of heating, cooking or roasting granular-type foods such as nuts and seeds, and in particular coffee beans. Many of these granular-type foods have a small surface area, are poor thermal conductors and are not intended to be heated, cooked or roasted more thoroughly on the outside than on the inside. Therefore, these foods are poorly suited for conventional forced air ovens.

Broadly stated, the invention is comprised of a housing with an inner chamber and a hollow drum that is rotatably mounted in the inner chamber. The drum is provided with a helical fin that pushes or advances food inside the drum toward a front end of the drum. The wall of the hollow drum is also provided with perforations through which heated gaseous streams, such as air, enter the drum. Supply perforations are located in the front end and return perforations are located near the rear end of the drum. Thus, when heated gases are supplied at sufficient velocity, the food is blown away from the walls of the drum and toward the rear of the drum. This results in a churning of the food that allows the heated gaseous stream to surround each of the granules of food, and thereby provide an even transmission of heat to substantially the entire surface of the food. In addition, wire mesh is provided to prevent food from passing through the perforations in the wall of the drum and for collecting dislodged particles.

In the preferred embodiment, the invention also comprise a door for accessing the inner chamber of the housing. When closed, the door is adapted to abut the front end of the drum. This prevents food from escaping through the open front end of the drum during the heating, cooking and roasting process. In addition, this door has feed and discharge gates for inserting and removing food from the drum without opening the door. The door is also provided with a silicone seal and a positive type lock for providing an air tight seal between the door and the housing.

In the preferred embodiment, the invention also comprises a solid state control panel for operating the apparatus, and a separate switch for turning off the supply fan so that the helical fin can push the food out the discharge gate in the door. Finally, the preferred embodiment is provided with an exhaust system for venting the odorous gases that are produced when food is heated, cooked or roasted.

One advantage of the invention is that the food is churned so that a heated gaseous air stream surrounds each granule of food, and thereby provides an even distribution of heat to the surface of the food. The churning allows the center of a nut, seed or bean to be heated to a predetermined temperature more quickly and with a cooler operating temperature than is required in conventional-type roasters. As a result, less energy is required and the outer surface of the food is less likely to burn.

Another advantage is that odorous gasses produced when food is heated, cooked or roasted are vented outside the apparatus. Therefore, these gasses do not form a distasteful and thermally non-conductive film on the surface of the food. For example, the organic gasses which polymerize into carcinogenic tar during the roasting of coffee beans will not deposit on the surface of the beans. As a result a cooler operating temperature may be used to produce beans that exhibit better flavor, body and aroma with the savings in energy being passed on to the consumers.

A further advantage is that particles which are dislodged from the food during heating, cooking or roasting are driven away from the food and collected by the wire mesh in the drum. Consequently, these typically burned particles are not mixed in with the food. For example, when coffee beans are roasted the chaff is separated from the beans and collected on the wire mesh near the rear end of the drum. As a result, a low thermal conducting film is not formed on the surface of the beans, and the chaff is not mixed with the beans after completion of the roasting process. Again, the roasting process can use a reduced operating temperature to produce coffee beans with better flavor, body and aroma.

A further advantage in roasting coffee beans is that air heated to a temperature of less than 500 degrees Fahrenheit may be used. At temperatures below 500 degrees Fahrenheit, the organic gasses produced during roasting will not readily polymerize into carcinogenic tar. Thus, the energy that is normally consumed by the afterburners of conventional coffee bean roasters need not be expended. This savings in energy is typically ⅔ of the energy normally required to roast coffee beans.

A further advantage in roasting coffee beans is that fires, which commonly occur in conventional roasters, are less likely to occur in the present invention. Consequently, the present invention is more suited for use in commercial businesses, such as restaurants and coffee shops, or in residences with lower risk of fire, and without the increased insurance rates that result from the use of commercial roasters.

A further advantage in roasting coffee beans is that the present invention is relatively inexpensive and space efficient compared to conventional coffee bean roasters. This makes the present invention more suitable for commercial and residential use. Thus, the staling of coffee beans can be reduced because restaurants, coffee shops and home users will be able to roast, grind and brew coffee without the delays caused during the packaging and shipping of pre-roasted beans. Consequently, consumers are able to make or purchase coffee beans at a substantially lower cost and brew coffee with better flavor, body and aroma.

Other advantages and aspects of the invention will become apparent upon review of the specification, claims, and drawings.

BRIEF DESCRIPTION OF DRAWINGS

FIG. 3 is a front view of the apparatus with the door opened to show its inside:

FIG. 6 is a cross-sectional view of FIG. 3 taken along line 6—6, showing the channel in the door and its seal; and FIG. 7 is a perspective view of the apparatus, partially cut-away to show the exhaust system.

DETAILED DESCRIPTION OF THE INVENTION

While this invention is susceptible of embodiments in many different forms, the drawings show and the specification describes in detail a preferred embodiment of the invention. It should be understood that the disclosure is to be considered an exemplification of the principles of the invention. It is not intended to limit the broad aspect of the invention to the embodiment illustrated.

Figure 1:
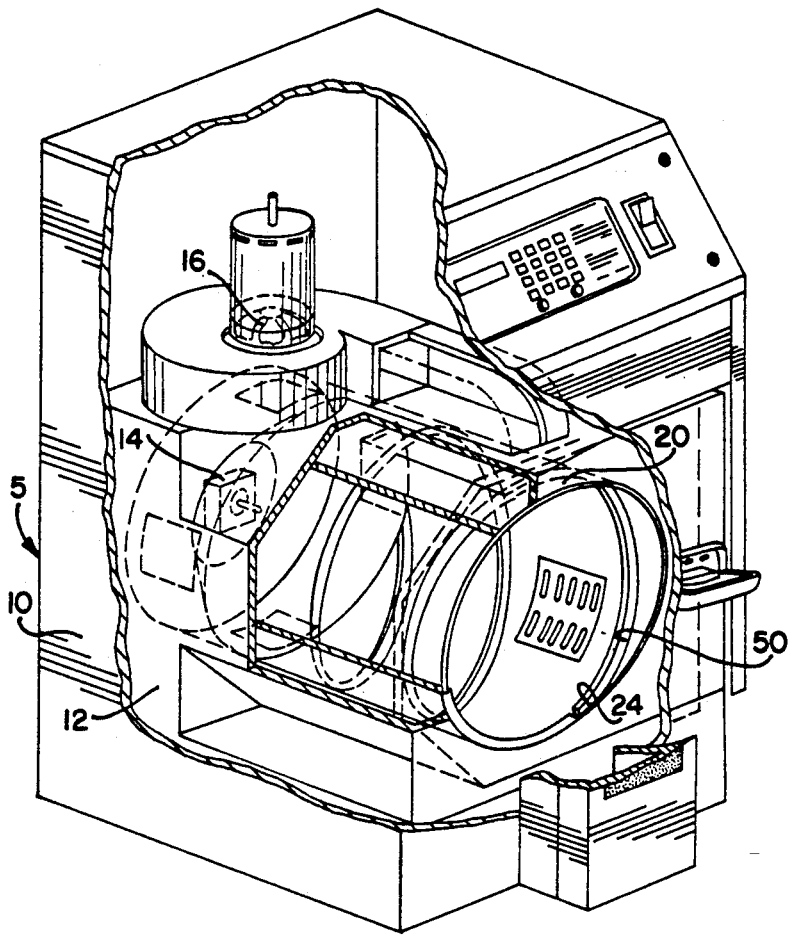
FIG. 1 is a perspective view of the apparatus with a partially cut-away portion revealing the drum and air supply components.
Figure 2:
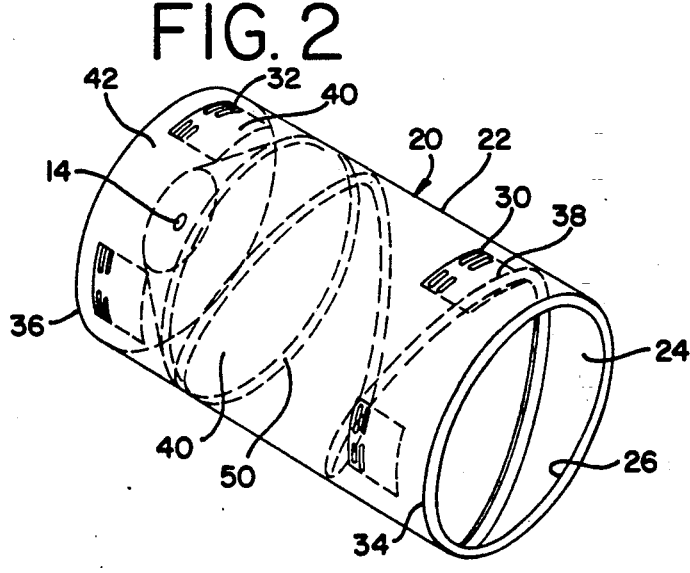
FIG. 2 is a perspective view of a drum assembly that has been removed from the housing.

As shown in FIGS. 1 and 2, the present invention is an apparatus 5 for heating, cooking or roasting granular-type foods. The apparatus has an air tight housing 10 with an inner chamber 12 and a hollow drum 20 which is rotatably mounted 14 in the inner chamber 12. The inner chamber 12 also contains a fan 16 for forcing gaseous streams such as air into and through the hollow drum 20. The inner chamber 12 also contains a means for heating the gaseous streams, such as an electrical heating element (not shown).

The drum 20 has a wall 22 which is preferably cylindrical in shape. The wall 22 defines the interior 24 of the drum. The wall has an inside surface 26. A plurality of supply perforations 30 are formed in the wall 22 of the drum for allowing heated gaseous streams to flow into the drum 20 during the heating, cooking or roasting process. In addition, a plurality of return perforations 32 are formed in the wall 22 of the drum for allowing the heated gases to exit from the interior 24 of the drum and return to the fan 16.

In the preferred embodiment of the invention, the supply perforations 30 are located near a front end 34 of the drum 20 and the return perforations are located near a rear end 36 of the drum. When the perforations 30 and 32 are positioned in this manner, and when the heated air is supplied to the drum with sufficient velocity, the food is blown away from the wall 22 of the drum and toward the rear end 36 of the drum.

The drum 20 is also provided with a helical fin means for pushing or advancing the granules of food toward the front end 34 of the drum. In the preferred embodiment a helical fin 50 is attached to the inside surface 26 of the drum. Thus when the drum is rotated, the food on or near the inside surface 26 of the drum is advanced toward the front end 34 of the drum.

The essence of the present invention is that heated gaseous streams are able to surround each of the granules of food. To accomplish this, the food is churned inside the hollow drum 20 during the heating, cooking or roasting process. Churning occurs when food placed in a container is forced away from the walls of the container, such as by a stream of air, while an opposite force pulls the food toward the walls of the container, such as gravity or rotational force, and the combination of these opposite forces causes the food to move about in an essentially random manner.

The food may also be subjected to additional forces. For example in the preferred embodiment of the present invention, the granules of food are not only churned by the heated gaseous stream, but are blown toward the rear end 36 of the drum by another heated gaseous stream. This other or second gaseous stream is formed by the following: the placement of the supply perforations 30 and the return perforations 32, the inner action and combination of the gaseous streams entering the drum 20 through the supply perforations 30, the cylindrical shape of the interior 24 of the drum 20 and the dynamic forces produced by the fan 16. In addition, the granules of food are pushed toward the front end 34 of the drum by the helical fin 50.

FIGS. 1 and 2 also show that the drum 20 is provided with a means for preventing the food from passing through the perforations 30 and 32 in the drum 20. In the preferred embodiment this is accomplished by using wire mesh. A first wire mesh 38 is attached to the drum so that it covers the supply perforations 30. A second or rear wire mesh 40 is placed in the interior 24 of the drum so that a rear portion 42 of the interior 24 of the drum 20 is partitioned off from the remainder of the interior 24 of the drum. In the preferred embodiment the rear wire mesh 40 is cone shaped as shown in FIGS. 1 and 2. This cone shaped wire mesh 40 prevents the granules of food from being blown into the rear portion 42 of the drum, where the return openings 32 are located. In addition, the cone shaped wire mesh 40 collects crumbs or small particles, such as the chaff of a coffee bean, that are dislodged from the food during the heating, cooking or roasting process.

Figure 4:
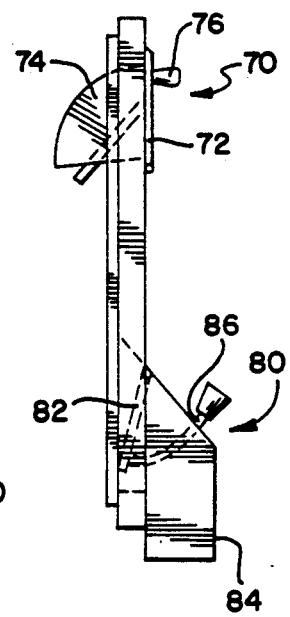
FIG. 4 is a cross-sectional view of FIG. 3 taken along line 4—4, showing the feed and discharge gates in a closed position.
Figure 5:
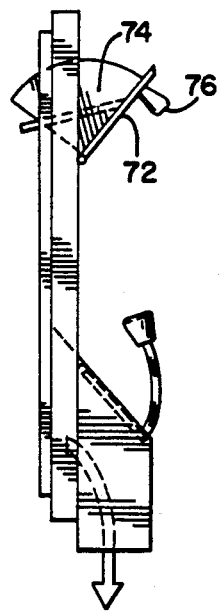
FIG. 5 is a cross-sectional view of FIG. 3 taken along line 4—4 showing the feed and discharge gates in an open position.

As shown in FIGS. 3, 4 and 5, the present invention is provided with a door 60 for gaining access to the inner chamber 12 of the housing 10 and the interior 24 of the drum 20. The door 60 is adapted to abut the front end 34 of the drum 20 when the door is closed so that food cannot escape from the front end 34 of the drum. In the preferred embodiment the door 60 is provided with a seal 62 that fits into a channel 64 welded to the surface 68 of the periphery 66 of the door. This seal 62 engages the front housing 141 when the door is closed. The door is also provided with a positive lock 69 that securably engages a housing latch 15 so that an air tight seal is achieved when the door is closed.

In the preferred embodiment the door 60 is also provided with a feed gate 70 for inserting food into the drum, and a discharge gate 80 for removing food from the interior 24 of the drum 20 without opening the door. The feed gate 70 is comprised of a cover plate 72, a holding bin 74 and a handle 76. The holding bin 74 is weighted so that the feed gate 70 will remain closed unless the handle 76 is pulled by the operator. The discharge gate 80 is comprised of a closure plate 82, a cover plate 84 and a handle 86. The handle is weighted so that the discharge gate remains closed unless the handle is pulled or the pressure inside the drum pushes odorous gases out.

As shown in FIGS. 1 and 3 the preferred embodiment is provided with a solid state control panel 100 for operating the apparatus. The control panel has a switch 102 for delivering power to heat the gases and rotate the drum 20. The panel is also provided with a separate switch 104 for delivering power to the supply fan 16. When the heating, cooking or roasting process is completed, the fan switch 104 can be turned off and the granules of food will no longer be blown toward the rear end 36 of the drum. This allows the helical fin 50 to push the food toward the front end 34 of the drum. The helical fin 50 pushes the food through the discharge gate 80 when the closure plate 82 is pulled open.

As shown in FIG. 7, the preferred embodiment is provided with an exhaust system 120 for venting odorous gasses that are produced during the heating, cooking or roasting process. The exhaust system is comprised of a intake vent housing 122, an exhaust duct 124, an exhaust fan 126 and an exhaust elbow 128. In the preferred embodiment the intake vent housing 122 is located directly under the cover plate 84 of the discharge gate 80, so that gasses vented from the discharge gate are drawn into the intake vent opening 130. In addition, the intake vent opening 130 is covered by a wire mesh 132 that prevents food from entering the exhaust system. The exhaust system 120 is preferably vented to the outside of a building, such as by connecting the exhaust elbow 128 to the vent stack of a building. The exhaust system is preferably located below the housing and is concealed by skirting 140 that is attached to the housing 10.

While the invention has been described with reference to a preferred embodiment, it will be understood by those skilled in the art that various changes may be made and equivalents may be substituted without departing from the broader aspects of the invention.

I claim:

1. An apparatus for heating, cooking or roasting granules of a granular food, such as nuts, seeds or coffee beans, each of said granules having an outer surface, said apparatus comprising a housing enclosing an inner chamber; door means for allowing access to said inner chamber; a hollow drum rotatably mounted in said inner chamber, said drum having front and rear ends and a side wall; said front end being open and said side wall having supply and return perforations therein said supply perforations being located near said front end of said drum and said return perforations being located near said rear end of said drum, and; fan means for supplying a heated gaseous stream into and through said hollow drum, said heated a gaseous stream entering said hollow drum through said supply perforations and exiting said hollow drum through said return perforations, said heated gaseous stream being supplied to said hollow drum with sufficient velocity to blow said granules of food towards said rear end of said drum; means for moving a heated gaseous stream at a velocity sufficient to push said granules of food away from said wall of said drum, whereby said stream surrounds said outer surface of each of said granules; means for preventing said granules of food from passing through said perforation in said side wall of said hollow drum; and means for preventing said food from exiting through said open front end of said drum.

2. The apparatus of claim 1, further comprising a helical fin means for advancing said food toward said front end of said drum.

3. The apparatus of claim 1, wherein said means for preventing food from passing through said supply and return perforations is wire mesh.

4. The apparatus of claim 3, wherein said wire mesh is secured to said wall of said drum and covers said supply perforations.

5. The apparatus of claim 3, wherein wire mesh is also secured to said inside of said hollow drum, and partitions off a rear portion of said drum where said return perforations are located.

6. The apparatus of claim 5, wherein said wire mesh that partitions off said rear portion of said drum is cone-shaped.

7. The apparatus of claim 1, wherein said means for preventing food from exiting said front end of said drum is a door, said door being adapted to abut said front end of said drum when said door is closed.

8. The apparatus of claim 7, wherein said door has an inside and an outside surface, said inside and outside surfaces each having a periphery, and said outside periphery having a lock attached thereto; said lock being adapted to securably clamp said door to a latch on said housing when said door is closed; said inside surface periphery having a channel therein, said channel being adapted to receive a seal; and said seal being adapted to engage said housing and form an air-tight seal when said door is closed and said lock is securely clamped to said latch on said housing.

9. The apparatus of claim 8, wherein said lock is a positive lock, said channel is stainless steel and said seal is silicone.

10. The apparatus of claim 7, wherein said door is provided with a feed gate means for inserting said food into said drum when said door is closed.

11. The apparatus of claim 7, wherein said door is provided with a discharge gate means for removing said food from said drum when said door is closed.

12. The apparatus of claim 11, wherein said helical fin pushes said food out of said discharge gate when said discharge gate is open.

13. The apparatus of claim 12, further comprising a control panel, said control panel having a main power switch and a fan cut-off switch, said main power switch providing power to heat said gaseous stream and rotate said drum, and said fan cut-off switch providing power to said fan means.

14. The apparatus of claim 1, further comprising an exhaust system for venting odorous gasses from said inner chamber.

15. The apparatus of claim 14, wherein said exhaust system comprises an intake vent through which said odorous air enters said exhaust system, a discharge exhaust elbow through which said odorous gasses exit said exhaust system, a discharge exhaust duct, and a discharge exhaust fan for forcing said odorous gasses into said intake vent, and through said duct and elbow.

16. The apparatus of claim 1, wherein said heated gaseous stream is a heated air stream.

17. An apparatus for heating or roasting granular food, such as nuts, seeds or coffee beans, each of said granules of food having an outside surface and an inside, and said apparatus comprising:

a housing with an inner chamber;

a hollow drum rotatably mounted in said inner chamber, said hollow drum having a side wall with perforations, and having an open front end, said perforations include both supply perforations and return perforations, said supply perforations being located near said front end of said drum, and said return perforations being located near a rear end of said drum;

a fan that supplies a heated gaseous stream through said perforations and into said hollow drum, said heated gaseous stream entering said hollow drum through said supply perforations and exiting from said hollow drum through said return perforations, said heated gaseous stream blowing said food toward said rear end of said drum;

means for preventing food from passing through said perforations; and means for preventing food from passing through said open front end.

18. The apparatus of claim 17, wherein said fan moves said heated gaseous streams at a velocity sufficient to push said granules of food away from said side wall of said drum.

19. The apparatus of claim 17, further comprising a helical fin for pushing said food toward the front end of said drum, said helical fin being attached to an inside surface of said drum, and wherein said drum is cylindrical.

20. The apparatus of claim 17, wherein said heated gaseous stream is a heated stream of air.

21. The apparatus of claim 17, wherein said means for preventing said food from passing through said supply perforations is wire mesh that is secured to said side wall of said drum and covers said supply perforations.

22. The apparatus of claim 17, wherein said means for preventing said food from passing through said return perforations is wire mesh secured to the interior of said hollow drum, said wire mesh partitioning off a rear portion of said drum, and wherein said return perforations are located in said rear portion.

23. The apparatus of claim 22, wherein said wire mesh that partitions off said rear portion of said drum is cone shaped.

24. The apparatus of claim 17, wherein said means for preventing food from exiting said front end of said drum is a door, said door being adapted to abut said front end of said drum when said door is closed.

25. The apparatus of claim 24, wherein said door has inside and outside surfaces, said inside and outside surfaces each having a periphery, said outside periphery having a lock attached thereto, said lock being adapted to securably clamp said door to a latch on said housing when the door is closed, said inside surface periphery having a channel therein, said channel being adapted to receive a seal, and said seal being adapted to engage said housing to prevent said heated gaseous stream from escaping from said inside of said housing when said door is closed and said lock is securably clamped to said latch on said housing.

26. The apparatus of claim 24, wherein said door is provided with a feed gate for inserting food into said drum when said door is closed.

27. The apparatus of claim 24, wherein said door is provided with a discharge gate for removing food from said drum when said door is closed.

28. The apparatus of claim 19, wherein said helical fin pushes said food out of said discharge gate when said discharge gate is open.

29. The apparatus of claim 28, further comprising a control panel, said control panel having a main power switch and a fan cut-off switch, said main power switch providing power to heat said gaseous stream and rotate said drum, and said fan cut-off switch providing power to said fan means.

30. The apparatus of claim 17, further comprising an exhaust system for venting odorous gasses from said inner chamber.

* * * * *

UNITED STATES PATENT AND TRADEMARK OFFICE
CERTIFICATE OF CORRECTION

PATENT NO. : 5,193,444
DATED : March 16, 1993
INVENTOR(S) : Shlomo Bar-Sheshet

It is certified that error appears in the above-indentified patent and that said Letters Patent is hereby corrected as shown below:

Col. 2, line 63, delete "is" and insert--are--

Col. 3, line 32, add "s" to "comprise"

Col. 4, line 57, change ":" to ";"

Col. 6, line 64, change "a" to "an"

Col. 7, line 29, delete "a" after "heated"

Signed and Sealed this

Twelfth Day of July, 1994

Attest:

BRUCE LEHMAN

Attesting Officer

Commissioner of Patents and Trademarks